(12) United States Patent
Garcia (10) Patent No.: US 7,493,242 B1
(45) Date of Patent: Feb. 17, 2009

(54) MATHEMATICAL MODEL FOR PREDICTING THE THERMAL BEHAVIOR OF AN ITEM

(75) Inventor: Ariel F. Garcia, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 354 days.

(21) Appl. No.: 10/985,068

(22) Filed: Nov. 10, 2004

(51) Int. Cl.
*G06F 17/10* (2006.01)

(52) U.S. Cl. .......................................................... 703/2
(58) Field of Classification Search ........................ 703/2
See application file for complete search history.

(56) References Cited

U.S. PATENT DOCUMENTS

| | | | |
|---|---|---|---|
| 5,561,612 A | 10/1996 | Thakur | 364/557 |
| 6,018,150 A | 1/2000 | Maher, Jr. | 219/497 |
| 6,164,816 A | 12/2000 | Aderhold et al. | 374/1 |
| 6,290,505 B1 | 9/2001 | Garcia | 434/300 |
| 6,453,219 B1 | 9/2002 | Kazmierowicz et al. | 700/299 |
| 6,497,509 B2 * | 12/2002 | Merzliakov et al. | 374/44 |
| 6,610,968 B1 * | 8/2003 | Shajii et al. | 219/497 |
| 2003/0065555 A1 | 4/2003 | von Gonten et al. | 705/10 |

* cited by examiner

*Primary Examiner*—Hugh Jones
(74) *Attorney, Agent, or Firm*—Fredric J. Zimmerman (57) ABSTRACT

A visual curve fitting method for mathematically modeling the thermal response of an item based upon the generic thermal response equation $T_2 = T_1 + (T_{env.} - T_1) \times F$. Using a spreadsheet application with a graphical user interface (GUI), a graph is displayed with a set of generic thermal response curves and a set of actual thermal response data curves. By manipulating a series of slide bars displayed on the GUI, values are selected and input into the generic equation in order to change the shape and position of the generic curve set. Manipulating the slide bars in combination until the generic curve set overlays the actual curve set results in a set of equations (thermal model) that accurately characterizes the thermal behavior of the item under a reasonable range of temperature changes.

20 Claims, 9 Drawing Sheets

MATHEMATICAL MODEL FOR PREDICTING THE THERMAL BEHAVIOR OF AN ITEM

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

1. Field of the Invention

The present invention relates to mathematical modeling techniques and, more particularly, the process of visually fitting one or more curves to a limited set of empirical data for the interpolation or extrapolation of a complete predictive data set and, even more particularly, to a simplified means for describing and predicting the thermal behavior of an item subjected to conditions meant to induce heat transfer within the item.

2. Description of the Background

The basic concept of a thermal model works through mathematical manipulation of equations with the purpose of matching a predetermined thermal response. Conventional thermal models are based upon the fact that an object at an initial temperature ($T_1$), exposed for predetermined period of time to an environmental temperature ($T_{env.}$), the temperature of the object at the end the time period ($T_2$) will be some temperature between T env. and $T_1$. The basic equation is as follows:

$$T_2 = T_1 + (T_{env.} - T_1) \times F$$

Where:

F=constant fraction (a number between 0 and 1)

This basic principle works well to represent the skin (i.e. outer layer) response of any object or to represent objects that are small and have a high thermal conductivity (like a metal wire). However, when the object in question has a large thermal mass and a complicated internal configuration with different materials, the thermal response of the inside parts lags the skin response and the mathematical equations describing the thermal response are not easy to develop.

Previously, an engineer needed to know a great deal about an object in order to generate a mathematical model describing, or predicting, its thermal behavior. The information set had to include the size, shape, and weight of the item, as well as certain material-of-construction properties such as, but not limited to, heat capacity, thermal conductivity, and heat transfer coefficient. Only then could a mathematical model of the item's thermal response be generated. The model then required validation with an instrument-laden version of the item in question. This had to be done to demonstrate the correlation between the values of temperature vs. time predicted by the model as compared to the actual values generated during testing. While the rise of computer technology has aided the process significantly, the creation of the initial model has always been a very cumbersome process requiring a great deal of time.

The present inventor is not the first to address the prediction of thermal behavior in an object. For example, U.S. Pat. No. 6,164,816 to Aderhold et al. discloses a technique and system for tuning temperature sensor readings in a thermal processing chamber that includes determining an actual temperature profile for a substrate based on measurements of the substrate. A simulated temperature profile for the substrate is calculated using a respective interim temperature correction value for one or more temperature sensors associated with the chamber. A Gaussian-like distribution for thermal contributions from multiple radiation sources in the chamber is used to simulate the temperature profile. The simulated temperature profile and the actual temperature profile are combined to form an estimated temperature profile. A final value for each respective temperature correction value is determined using an optimization algorithm which results in the estimated temperature profile being substantially uniform across the surface of the substrate. Each final temperature correction value is used as an offset to temperature measurements obtained from the corresponding temperature sensors. Unfortunately, the Aderhold et al. technique/system only generates a series of temperature correction values, it does not provide a thermal behavior model (i.e. each temperature correction value is used as an offset to actual temperature measurements obtained from a series of temperature sensors).

Additionally, generic curve fitting software is well-known. For example, a software application entitled "Curve Fitting Toolbox" is commercially-available from The MathWorks, Inc. of Natick, Mass. (see "www.mathworks.com/products/curvefitting"). Unfortunately, significant re-programming effort and knowledge would be required to modify/customize a generic software application, such as that identified above, for use in thermal behavior modeling. Even then, the modified/customized application would not readily provide the user-friendly visual controls required to manually approximate non-linear regression by manipulating a set of generic curves to fit a set of actual measured curves.

Therefore, there remains a need for a thermal behavior modeling technique designed to predict the thermal response of an item, subjected to conditions meant to induce heat transfer within the item, via interpolation or extrapolation from a limited set of actual temperature data. The modeling technique should not require the copious amounts of data (e.g. item size, shape, and weight, material-of-construction heat capacity, thermal conductivity, and heat transfer coefficient) needed heretofore. The modeling technique should be simple to use through manipulation of a series of visual controls and sufficiently flexible (mathematically) for use in a variety of thermal response applications. Finally, the modeling technique should not require the use of proprietary software, but be capable of implementation using any readily available spreadsheet software application (e.g. Microsoft® Excel®) to provide for widespread use.

SUMMARY OF THE INVENTION

It is, therefore, the primary object of the present invention to provide a method for modeling the thermal behavior of an item subjected to conditions meant to induce heat transfer within the item.

It is another object of the present invention to provide a thermal behavior modeling method that predicts thermal response via interpolation or extrapolation from a limited set of actual temperature data.

Yet another object of the present invention is to provide a thermal behavior modeling method that does not require copious amounts of item-specific data such as size, shape, and weight.

Still another object of the present invention is to provide a thermal behavior modeling method that does not require copious amounts of material-of-construction data such as heat capacity, thermal conductivity, and heat transfer coefficient.

It is another object of the present invention to provide a thermal behavior modeling method that is sufficiently flexible (mathematically) for use in a variety of thermal response applications.

Another object of the present invention is to provide a thermal behavior modeling method that is simple to use through manipulation of a series of visual controls.

Yet another object of the present invention is to provide a thermal behavior modeling method that does not require the use of proprietary software.

Still another object of the present invention is to provide a thermal behavior modeling method that may be implemented using any readily available spreadsheet software application to allow for widespread use and for evaluation of mass amounts of possible equations in a very short time.

These and other objects are accomplished by a method for mathematically modeling the thermal response of an item that requires only a limited set of actual data. The method is preferably implemented in a spreadsheet software application (e.g. Microsoft® Excel®) and begins by presenting a set of generic equations that represent the thermal response of a typical item. The equations (i.e. $T_2 = T_1 + (T_{env} - T_1) \times F$) are plotted on the present invention's graphical user interface (GUI) as a group of typically configured, generic thermal response curves. Next, a limited set of actual thermal response (i.e. temperature) data points corresponding to the item in question is plotted. The method proceeds with a curve-fitting approach (i.e. a visual approximation of non-linear regression) by which the configuration of the generic curves is modified to, as closely as possible, fit the plotted actual data.

The visual curve-fitting approach is premised upon two realized principles: (1) the rate of temperature change from the outer surface of an object to the inner core varies depending upon a variety of factors including object size and material, and (2) the efficiency of heat transfer within an object decreases as the difference in temperature between an outer and inner surface decreases. The model of the present invention captures the time lag in thermal response of an object from skin temperature to core temperature relative to an outside temperature by: (1) creating a series of artificial layers (i.e. 10 layers) in which the thermal response of one layer depends on the one next to it; and (2) using three different F values. The value of F is selected as a function of the delta temperature ($\Delta T$) between the temperature of the layer ($T_1$) and the temperature of the outer adjacent layer ($T_{env}$). Note that if $T_1$ the outer skin of an object, $T_{env}$ is the outside temperature. Thus, the model reflects that each outer artificial layer affects the adjacent inner layer's thermal response and the relative effect is made more pronounced as more layers are created deeper inside the object. Since the equations controlling the response of one layer are a function of the temperature of the layer adjacent to it, this is a convenient way of representing actual thermal response of different parts inside an object. The equation remains the same for each artificial layer ($T_2 = T_1 + (T_{env} - T_1) \times F$) with F changing as a function of delta temperature between the layer temperature and that next to it.

In the primary embodiment of the present invention, a model curve set is developed by visually curve-fitting predicted data (displayed in one color) with actual collected data (displayed in a second color). Actual collected data is plotted out in a series of curves representing actual temperatures taken over units of time. Each curved line of collected data is representative of an actual thermal response layer of the object. The visual curve-fitting of the present invention is accomplished by manually manipulating a series of slide bars visible on the GUI, including (1) a plurality of slide bars (i.e. 3) each representing a particular F value corresponding to the lift tail, skin, and thickness thermal response for each layer, and (2) two additional slide bars for representing temperatures (i.e. $T_1$ and $T_{env}$) for that layer. These slide bars supply the data to be programmed into the above equation and automatically plot the data as temperature over units of time overlaid on top of the actual collected data. A first constant F, which is set using one slide bar, is used to match the model curve set to the shape of the actual skin layer response (i.e. the temperature of the outer environment versus the temperature of the skin layer). The skin layer response is always very efficient. A second constant F, which is set using a second slide bar, is used to match the model curve set to the shape of the actual thermal thickness response (i.e. the temperature of the one internal layer vs. temperature of another adjacent internal layer of the object). A third constant F, which is set using a third slide bar, matches the curve set to reflect the tail response. The tail response reflects the inefficient thermal response when the bulk body temperature of the layer is near equilibrium. Artificial layers (i.e. 10) are created within the program such that plotted model curve set includes individual curves to correspond to each artificial layer. A model curve set is developed when the user sets the temperature slide bars in combination with the F value slide bars and thereby varies the visual configuration of the predicted data until generic curve set overlays the actual curve set. Thus, the generic curve set becomes and model curve set and the results are simultaneously validated.

Experimental results using the primary embodiment revealed that once a model curve set is configured for a particular object, the user may vary the temperature slide bars without affecting the relevancy of the model curve set. Thus, a simpler secondary embodiment was developed. Specifically, upon validating the primary embodiment it was determined that (1) the F value for the skin thermal response remained constant, and (2) F values for the model curve set for a given object remained constant when the $\Delta T$ over a unit of time was high, low, and in between, respectively.

The initial steps of the first and second embodiment are the same. The GUI of the secondary embodiment depicts a graph of temperature over time. Actual collected thermal response data for a given object is plotted with individual curves representing thermal response layers of the object. Additionally, changes in actual outside temperature are plotted. A model set curve is developed by visually curve-fitting predicted data (one color) with actual collected data (a second color) as well as with the plot of the actual outside temperature. A series of slide bars visible on the GUI are manually manipulated. A first constant F, represented by a first slide bar, is used for all skin responses. A second constant F, represented by a second slide bar, is used when the $\Delta T$ is greater than a selected value A. A third constant F, represented by a third slide bar, is used when the $\Delta T$ is between selected values A and B. A fourth constant F, represented by fourth slide bar, is used when the $\Delta T$ is less than value B. Two additional slide bars represent the value of A and B respectively. Each model set is divided into a series of artificial layers (i.e. 10) and the user manipulates the values on the slide bars until the plotted model curve set overlays the actual plotted data. Implementation of this secondary embodiment is much simpler because the user is not assigning a separate F value for each skin, tail, and thickness response for each artificial layer represented in the model curve set.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a method for mathematical modeling of the thermal behavior of an item subjected to conditions meant to induce heat transfer within the item. The method is readily implemented in software form for use on a conventional computer workstation with an appropriate operating system and spreadsheet application. The computer workstation may be, for example, a conventional personal computer with standard internal components (e.g. a microprocessor with peripheral chipset mounted on an appropriate motherboard). Of course, other more or less powerful computer systems can be used, but it is suggested that the computer system meet the minimum system requirements for Microsoft® Excel®, or an equivalent spreadsheet software application. The user interface is preferably a conventional color monitor and standard input devices such as a keyboard and mouse. The operating system is preferably Microsoft® Windows 98®, or a later revision. The software of the present invention may be compressed onto one or more installation disks and may be loaded onto a computer system as described above using conventional installation macros such as those provided with the aforementioned operating system.

Figure 1:
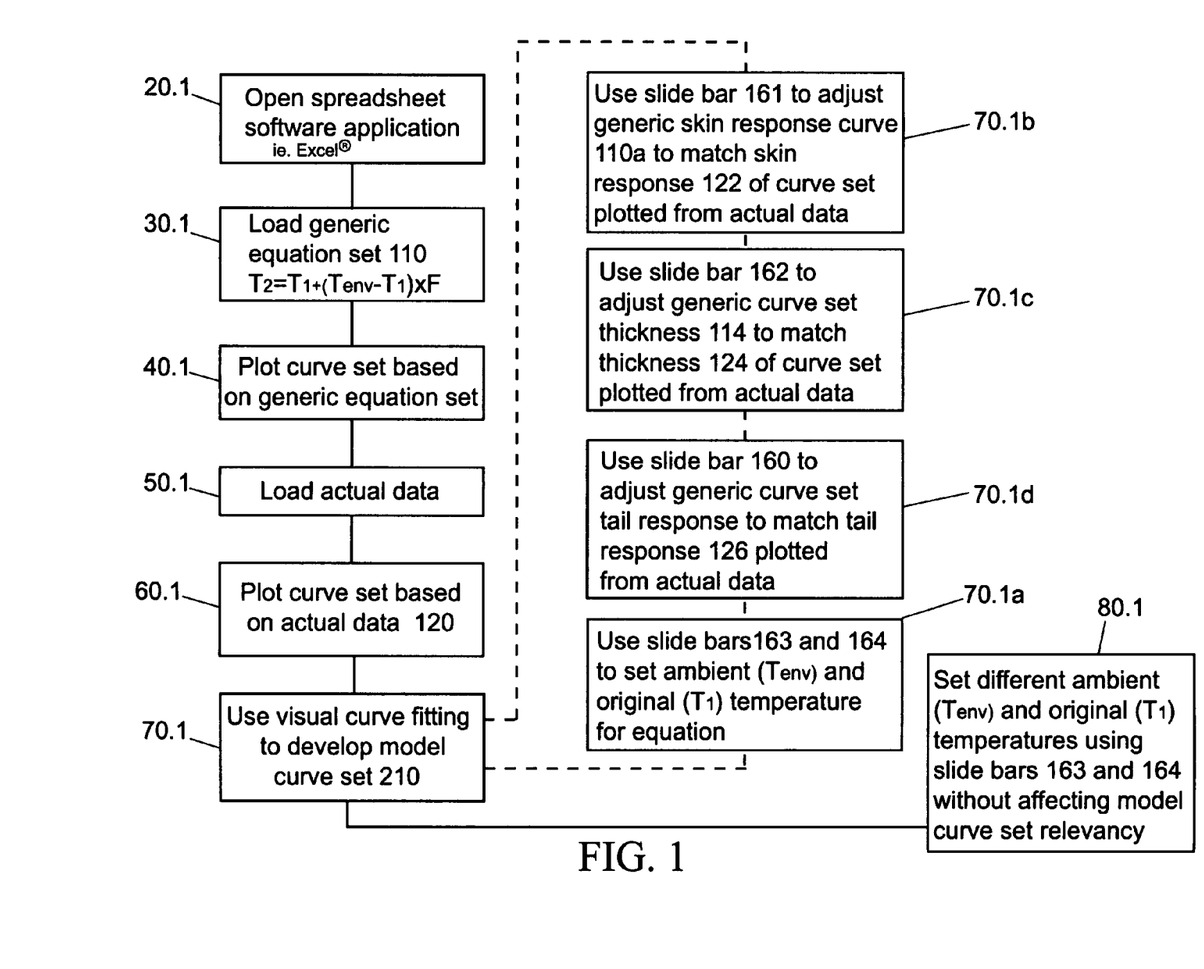
FIG. 1 is a flow chart of a method for modeling the thermal behavior of an item according to a primary embodiment of the present invention.

FIG. 1 is a top level flow chart delineating the basic steps required to perform the method for modeling thermal behavior of an item according to a preferred embodiment of the present invention At step 20.1, the method begins with the opening of the resident spreadsheet software application. As above, the method may be implemented in Microsoft® Excel® or any spreadsheet software application possessing functionality similar to that of Excel®.

Once the spreadsheet software is operational, a set of generic equations $(T_2=T_1+(T_{env.}-T_1)\times F)$ representing the typical thermal response of each artificial layer of a typical item is input at step 30.1. The value of $T_2$ is the current temperature of the object (or the particular layer within the object). The value of $T_{env}$ is the environmental temperature (or the temperature of the outer layer adjacent $T_1$). The value of $T_2$ is the temperature of the object (or the layer) at the end of a specified time period. The value of $(T_{env.}-T_1)$ is the delta temperature ($\Delta T$) or change in temperature per unit of time. F is a constant, the value of which is a fraction.

Figure 2:
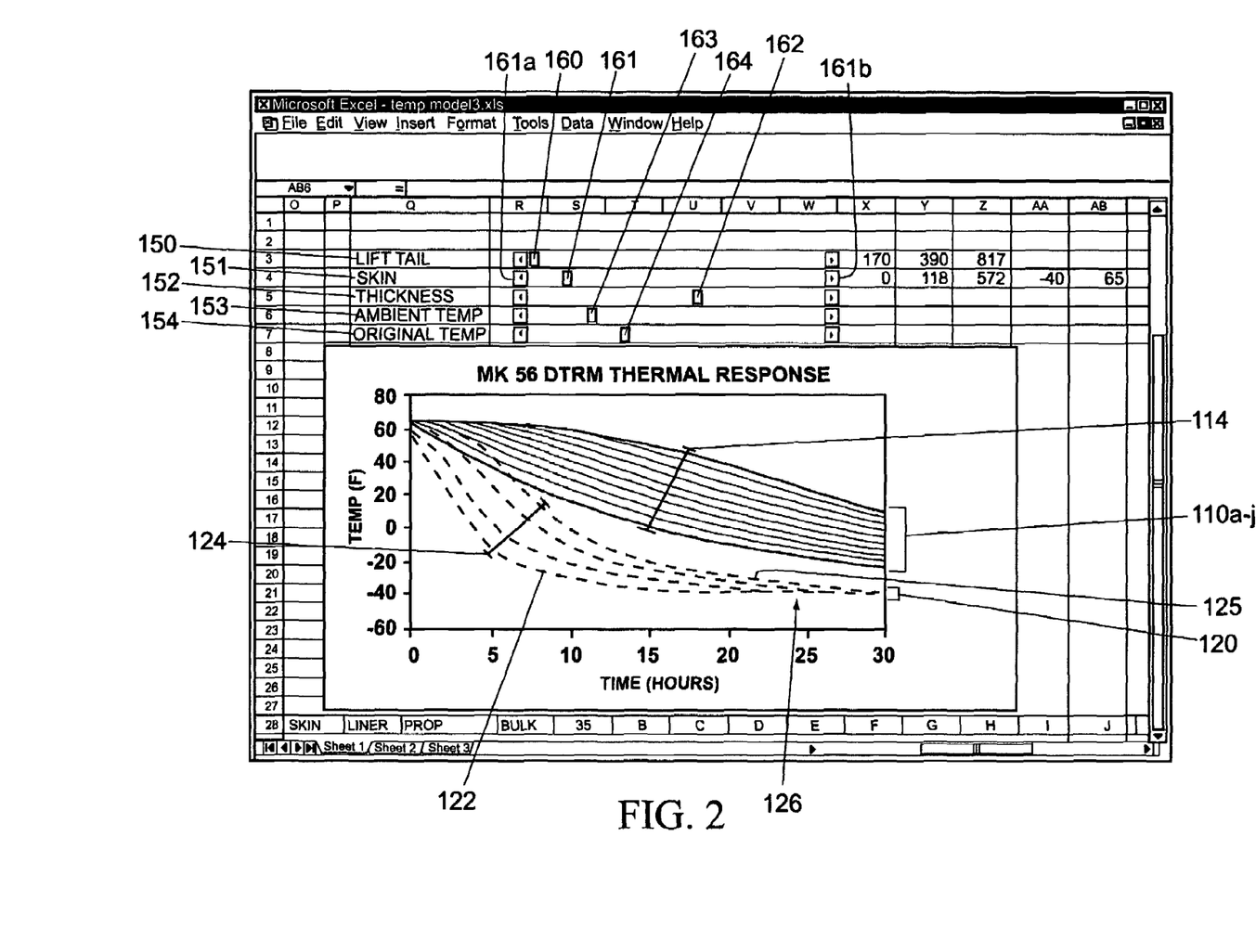
FIG. 2 is an exemplary printout of the thermal behavior modeling method's graphical user interface (GUI) screen upon completion of step 60.1 of FIG. 1.

Next, at step 40.1, the set of generic equations are implemented using the spreadsheet and are plotted and displayed on the present invention's graphical user interface (GUI) as a set of typically configured, generic thermal response curves 110. Referring to FIG. 2, Ref#110 illustrates a generic curve set with each of the curves (i.e. 10 curves 110$a$-$j$) in the generic curve set 110 representing an artificial layer of the generic object from its outermost skin layer 110$a$ to inner layers to the object core 110$j$.

Next, at step 50.1 and 60.1, a limited set of actual thermal response (i.e. temperature) data points corresponding to the item in question is loaded 50.1 and plotted and visually displayed 60.1, respectively, on the present invention's GUI as a set of actual thermal response curves (See FIG. 2, Ref#120). The actual thermal response curve set 120, representing actual thermal response of an object from its outer layer through its inner layers to its core. The set 120 generally includes curves representing data collected predetermined layers within the item (i.e. from the outer surface (skin) response 122, interior positions 128, and an object core 126).

A model curve set 210 (See FIG. 5, Ref# 210 discussed below) is then developed by supplying data to be loaded into the equations for the generic curve set 110, plotted and visually displayed in real-time as a model curve set (step 70.1). This step is accomplished using a visual curve-fitting approach at sub-steps 70.1$a$-$d$ (i.e. a visual approximation of non-linear regression) by which the configuration of the generic curves is modified to, as closely as possible, overlay the plotted actual data. In other words, the user will visually fit the generic curve set 110 to the actual curve set 120 to achieve a model curve set 210.

The visual curve-fitting approach is premised upon two realized principles: (1) the rate of temperature change from the outer surface of an object to the inner core varies depending upon a variety of factors including object size and material, and (2) the efficiency of heat transfer within an object decreases as the difference in temperature between an outer and inner surface decreases. Thus, the outer surface (skin) transfers heat very efficiently. When the delta temperature ($\Delta T$) is large (thickness), the bulk of the object transfers heat somewhat efficiently. When the item temperature is near equilibrium such that the delta temperature ($\Delta T$) is small (tail), heat transfer is not efficient. Keeping this in mind, curve-fitting is accomplished by: (1) creating a plurality of consecutive artificial layers (for example, 10 layers) to accommodate rate changes associated with relative position to the ambient temperature; and (2) varying the constant F to be plugged into the equation for each layer to reflect the variations in heat transfer efficiency between the object and the environment, including the response from the outer layer (skin), inner layers (thickness) and when the item is near thermal equilibrium (tail response). Each outer artificial layer affects the adjacent inner layer's thermal response and the resulting effect becomes a function of the change in temperature within the adjacent layer itself. Accumulating this effect in series results in a lagging delay reaction to changes in the environment which is the normal behavior in nature. The equation $(T_2=T_1+(T_{env.}-T_1)\times F)$ remains the same and is automatically computed for each layer with supplied data. However, each layer is defined by three different constants F corresponding to that layer's skin, thickness and tail response.

Referring in combination to FIG. 1 and to the exemplary printouts of FIGS. 2-6, the method of the present invention involves a series of visual curve fitting steps that results in thermal model. This method is a visual approximation of non-linear regression, by which the configuration of the generic curve set 110 is modified to, as closely as possible, fit the actual curve set 120. The generic curve set 110 is visually distinguishable from the actual curve set 120. For example, the two curve sets 110, 120 may be illustrated on the GUI in different colors, in different thicknesses of the curves making up the curve set, different structure of the curves making up the curves set (i.e. as shown in the figures, the generic curve set 110 is represented by solid curves and the actual curve set 120 is represented by broken curves), etc. The method begins at step 70.1 (FIG. 1) and proceeds with visual curve-fitting sub-steps 70.1a-d that are accomplished by manually manipulating a series of slide bars visible on the GUI. These slidebars include: (1) a plurality of slide bars (161, 162, and 160) each respectively representative of the F value corresponding to the skin response 151, thickness response 152, and tail response 150 of the artificial layers and (2) two additional slide bars (164 and 163) for setting the ambient $(T_{env})$ 153 and original $(T_1)$ 154 temperatures of the layers. Specifically, sub-steps 70.1a-d provide for setting the temperature slide bars (163 and 164) in combination with the F value slide bars (160-163). Manipulating each of these five slide bars (160-164) sets the values to be plugged into the equation for each artificial layer. Thus, each curve (110a-j) representing a layer is defined by the same equation, using 3 different values for the constant F for the skin, thickness, and tail. The results are plotted in real-time on the GUI display so that the user can manipulate the individual slide bars as necessary to vary the configuration of the generic thermal response curve set 110 such that the a model curves set 210 is developed that overlays the actual curve set 120 that includes the skin response, thickness response, and tail response.

At step 80.1, once a model curve set 210 is developed, the user may manipulate slide bars 163 and 164 to set the different ambient and original temperatures (set by using slide bars 163 and 164), without affecting the relevancy of the generic model equations.

FIGS. 2-6 illustrate the visual curve fitting process by slide-bar manipulation.

Figure 3:
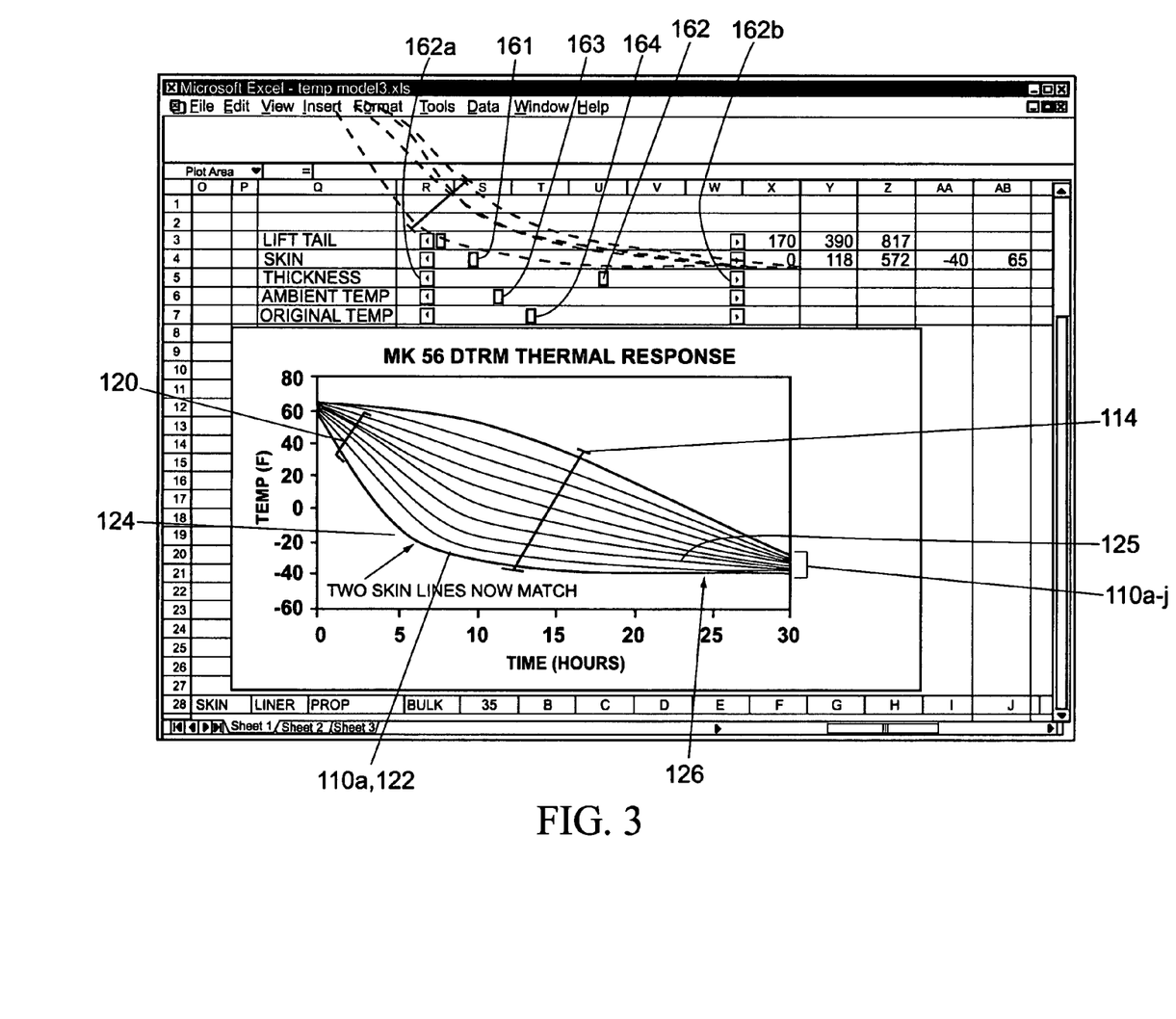
FIG. 3 is an exemplary printout of the thermal behavior modeling method's GUI screen illustrating sub-steps 70.1$a$ and 70.1$b$ of FIG. 1.

Refer to FIGS. 2-3, and particularly to the slide bar 161 representing the F value for skin response. The actual data curve set 120 indicates that the thermal skin response is initially most efficient (i.e. from 0-10 hours), meaning that the temperature of the skin or outer layer initially undergoes a rapid temperature adjustment. A greater equation constant F value will reflect this initial skin response. Therefore, as slide bar 161 for the skin response F value is slid towards the right, the F value increases. This causes curves (110a-j) of the generic curve set 110 to drop dramatically (i.e. between 0 and 10 hours). In particular, the outermost skin layer 110a and the immediately adjacent layers (i.e. 110b-j) drop off in a cascading manner over time. The user manipulates the slide bar 161 until generic skin curve 110a is aligned with actual skin response curve 122.

As stated above, the equation $(T_2=T_1+(T_{env.}-T_1)\times F)$ for the skin response curve is based on a relatively rapid percentage change in skin temperature $(\Delta T)$ per unit of time. As specifically illustrated in FIG. 2, in this particular case, the equation for the outer surface skin response curve 122 is based on a 39% change in skin temperature every two hours (i.e. the temperature differential between the skin of the item and the ambient temperature of the surrounding environment is reduced by 39% every two hours). The equation for each of the other thermal response lines is based on the temperature of the element next to it. The percentage of change per unit of time is a function of temperature differential. This is particularly true when the temperature difference is small (i.e. the tail response discussed below) and the process slows down.

FIGS. 2 and 3, respectively, show the relationship between the two curves 110a, 122 before and after the completion of this process. Moving the slide bar 161 to the right shifts the position of the generic skin response curve 110a downward (conversely, when necessary, moving the slide bar 161 to the left would shift the curve 110a upward). This process may be accomplished, via use of the computer's mouse, by clicking on slide bar 161 and dragging it to the new position or by clicking, as required, the arrow indicators 161a-b.

Figure 4:
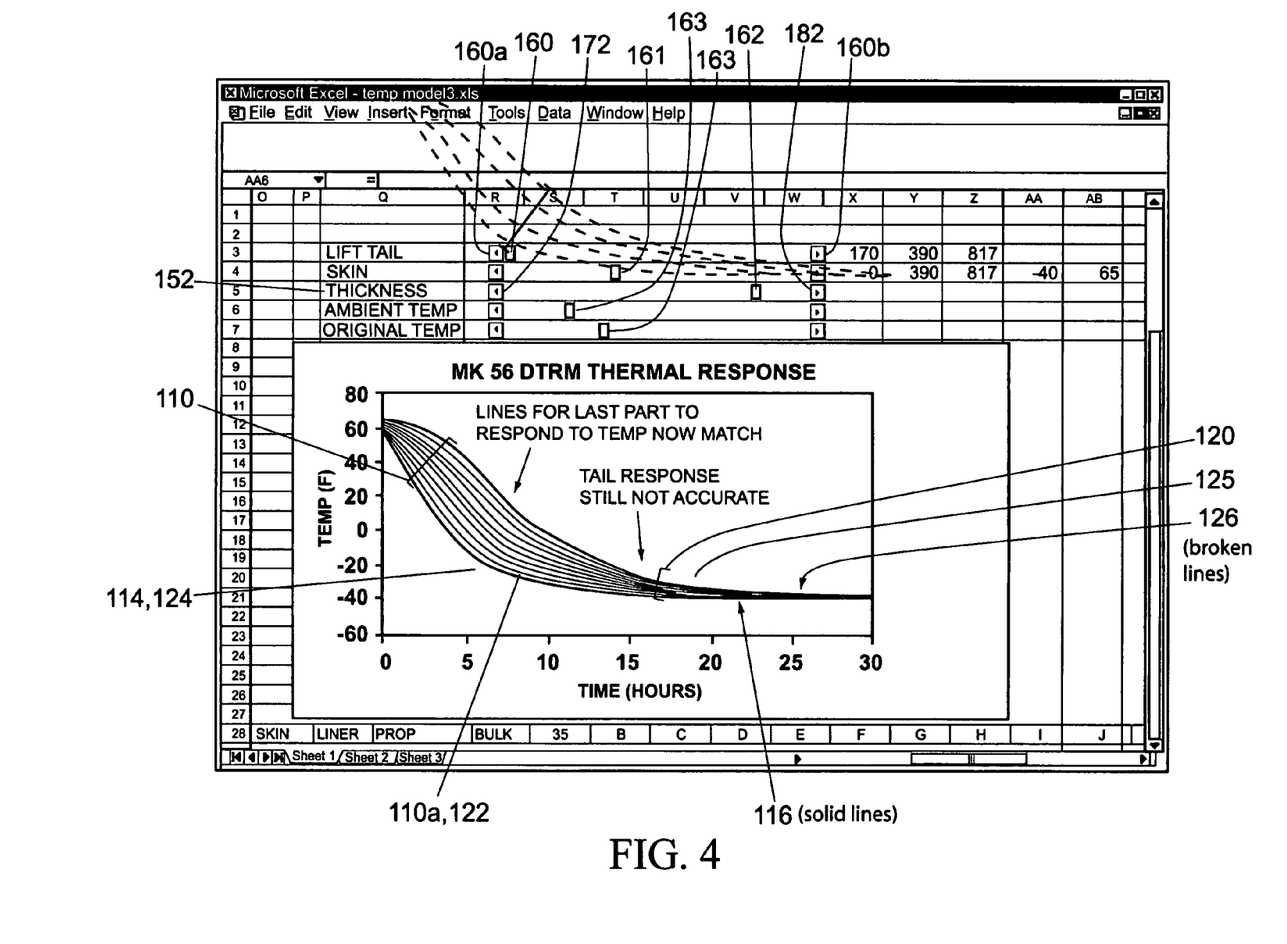
FIG. 4 is an exemplary printout of the thermal behavior modeling method's GUI screen illustrating sub-step 70.1$c$ of FIG. 1.

At sub-step 70.1c, the generic curve set thickness response represented by the relative distance 114 between the first curve 110a and the last curve 110j throughout the curve set 110 may be manipulated to match, as closely as possible, the relative distance 124 between actual data curves 122 and 125 throughout the actual data curve set 120. FIGS. 3 and 4, respectively, show the relationship between the thicknesses 114, 124 of the two curve sets 110, 120 before and after of this process. Moving the slide bar 162 to the right reduces the thickness of the curve set 114 (distance between 110a and 110j) of the generic curve set 110 (conversely, when necessary, moving the slide bar 152 to the left would increase the generic curve set thickness 114). This process may be accomplished, via use of the computer's mouse, by clicking on slide bar 162 and dragging it to the new position or by clicking, as required, the appropriate arrow indicator 162a orb.

Figure 5:
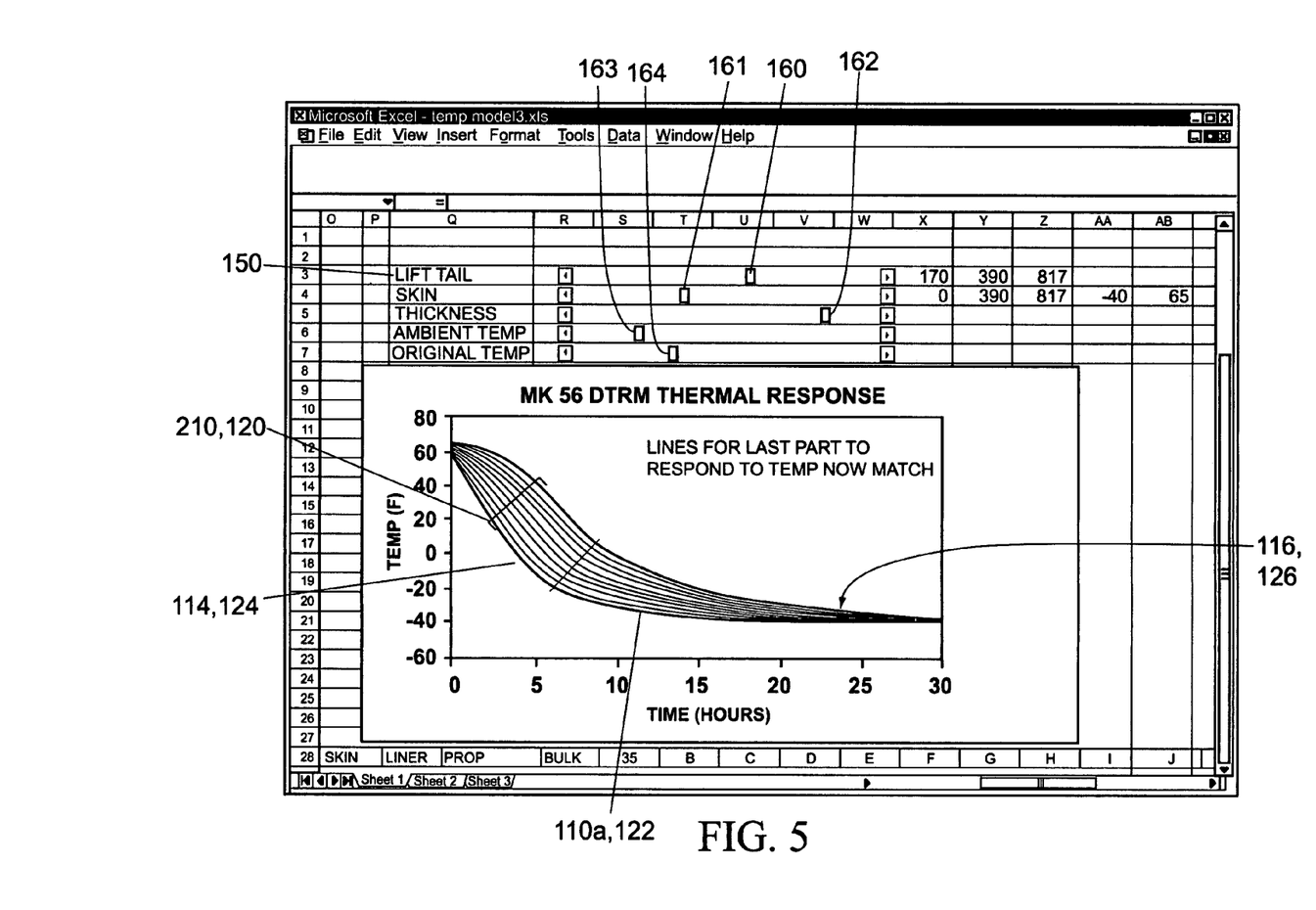
FIG. 5 is an exemplary printout of the thermal behavior modeling method's GUI screen illustrating sub-step 70. 1$d$ of FIG. 1 as well as model validation.

When the difference between the item temperature and the environment temperature is small, the transfer of heat is inefficient with relatively little heat transferred over time. This response is referred to herein as the tail response because when actual data is plotted out the object skin curve 122 and core curve 125 show little temperature change relative to each other over time and look much like a tail in relation to the rest of the actual data curve set 120. To correct for this inefficiency, the F factor value is changed when the $\Delta T$ (difference in temperature between the item and the environment) is small. This is referred to as the tail response. At step 70.1d, the generic curve set tail response 116, may be manipulated to match, as closely as possible, the tail response 126 of the actual data curve set 120. FIGS. 4 and 5, respectively, show the relationship between the tail responses 116, 126 of the two curve sets 110, 120 before and after the completion of this process. Moving the slide bar 160 to the right lifts the tail response 116 of the generic curve set 110 (conversely, when necessary, moving the slide bar 160 to the left would drop the generic curve set tail response 116). This process may be accomplished, via use of the computer's mouse, by clicking on slide bar 160 and dragging it to the new position or by clicking, as required, the appropriate arrow indicator 160a or b.

FIG. 5 illustrates the completion of step 70.1, the emergence of a model curve set 210 and the simultaneous validation of the model curve set 210 as compared to the actual data curve set 120 by showing the model curve set 210 overlaying and matching the actual data curve set 120.

Figure 6:
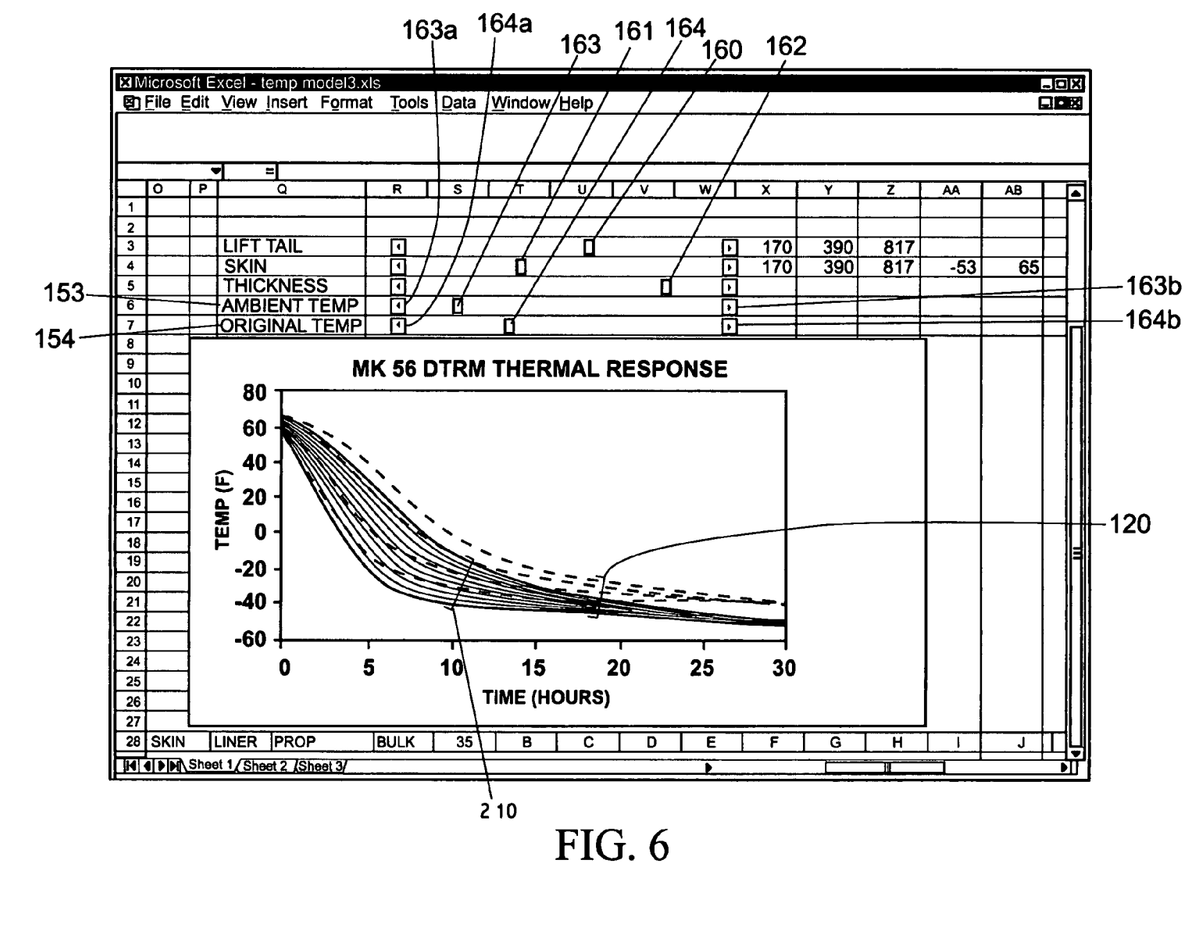
FIG. 6 is an exemplary printout of the thermal behavior modeling method's GUI screen illustrating step 80.1 of FIG. 1.

FIG. 6 shows the manner in which the model curve set 210, once it has been configured to closely match the actual curve set 120, may be adjusted, without affecting its relevancy, to compensate for different original (i.e. the starting temperature of the item, $T_1$) and ambient (i.e. the ending temperature of the item or the temperature of the environment surrounding the item, $T_{env}$) temperatures (See also step 80.1 of FIG. 1). In FIG. 6, the ambient temperature has been adjusted from −40° F. to −53° F. (the original temperature remained unchanged at 65° F.). Consequently, the model curve set 210 has shifted slightly downward over its entire response range and remains an excellent predictive model of the thermal response of the item measured to generate the actual curve set 120.

Moving the slide bar 163 to the right raises the ambient temperature (i.e. the temperature at which the model curve set 210 converges at the right side of the plot of FIG. 6) of the environment surrounding the item (conversely, when necessary, moving the slide bar 163 to the left would lower the ambient temperature). Moving the slide bar 164 to the right raises the original temperature (i.e. the temperature at which the generic curve set 210 diverges at the left side of the plot) of the item (conversely, when necessary, moving the slide bar 164 to the left would lower the item's original temperature). These processes may be accomplished, via use of the computer's mouse, by clicking on either slide bar 163 or 164 and dragging it to a new position or by clicking, as required, the appropriate arrow indicator 163a or b or 164a or b.

As is readily perceived in the foregoing description, the present invention allows a generic curve set 110 to be readily and quickly (generally, in less than one minute) fitted to an actual curve set 120 created from a minimal amount of actual data in order to develop a model representing the thermal behavior of an item (model curves set 210). The equation constants (F values) are pegged as closely as possible to match the actual curve set 120 with a minimal investment of time and effort. Those skilled in the art will recognize that the more actual data that is available in developing the model, the more accurate the model. In the preferred method, the user should obtain a response from an instrumented round that includes multiple large and small temperature changes between the object and the environment, in order to set the model equations so that they cover all possibilities the best possible way.

Note that depending on the software used (i.e. Excel® spreadsheets) the slide bars are programmable to have integer values, not the fractional values required for F constant. As discussed above, the constant F will always have a fractional value between 0 and 1. Those skilled in the art will recognize that the equation may be easily modified to compensate. For example, the range for each F may be programmed to be between 0 and 1000. The selected F value is then divided in the programmed curve equation by 1000 in order to obtain a fraction with three significant numbers to the right of the decimal point, allowing for fine resolution.

As stated above, FIG. 6 shows the manner in which the model curve set 210, once it has been configured to closely match the actual curve set 120, may be adjusted, without affecting its relevancy, to compensate for different original (i.e. the starting temperature of the item, $T_1$) and ambient (i.e. the ending temperature of the item or the temperature of the environment surrounding the item, $T_{env}$) temperatures (See also Step 80 of FIG. 1). This illustrates that it is the change in temperature ΔT, not the actual temperatures that are relevant to the model curve set 210.

As a result of the findings depicted in FIG. 6, a secondary embodiment of the present invention was developed.

Figure 7:
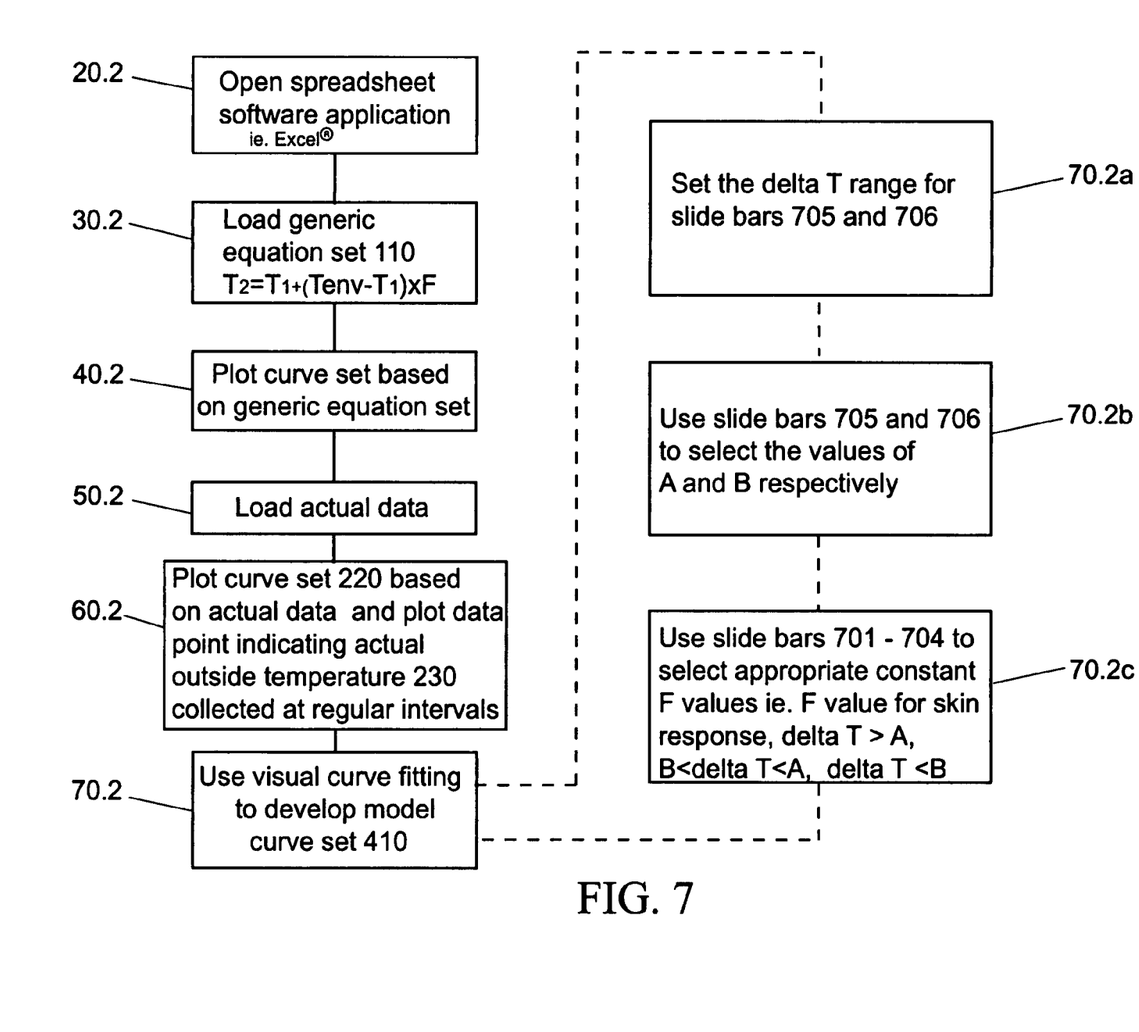
FIG. 7 is a flow chart of a method for modeling the thermal behavior of an item according to a secondary embodiment of the present invention.

FIG. 7 is a flow chart of a method for modeling the thermal behavior of an item according to this secondary embodiment of the present invention. Referring to FIG. 7, the first few method steps of the secondary embodiment are the same as for the primary embodiment. Namely, steps 20.2 through 50.2 are the same as steps 20.1 through 50.1, respectively of FIG. 1. Step 60.2 includes plotting a curve set based upon actual data and plotting data points indicating actual outside temperature recorded at regular intervals. As with step 70.1 of the primary embodiment, in step 70.2 the user will use a visual curve fitting approach to develop a model curve set 410. However, the sub-steps of step 70.2 vary. As with the primary embodiment, the generic curve set 310 is visually distinguishable from the actual curve set 220. For example, the two curve sets 310, 220 may be illustrated on the GUI in different colors, in different thicknesses of the curves making up the curve set, different structure of the curves making up the curves set (i.e. as shown in the figures, the generic curve set 310 is represented by solid curves and the actual curve set 220 is represented by broken curves), etc.

Figure 8:
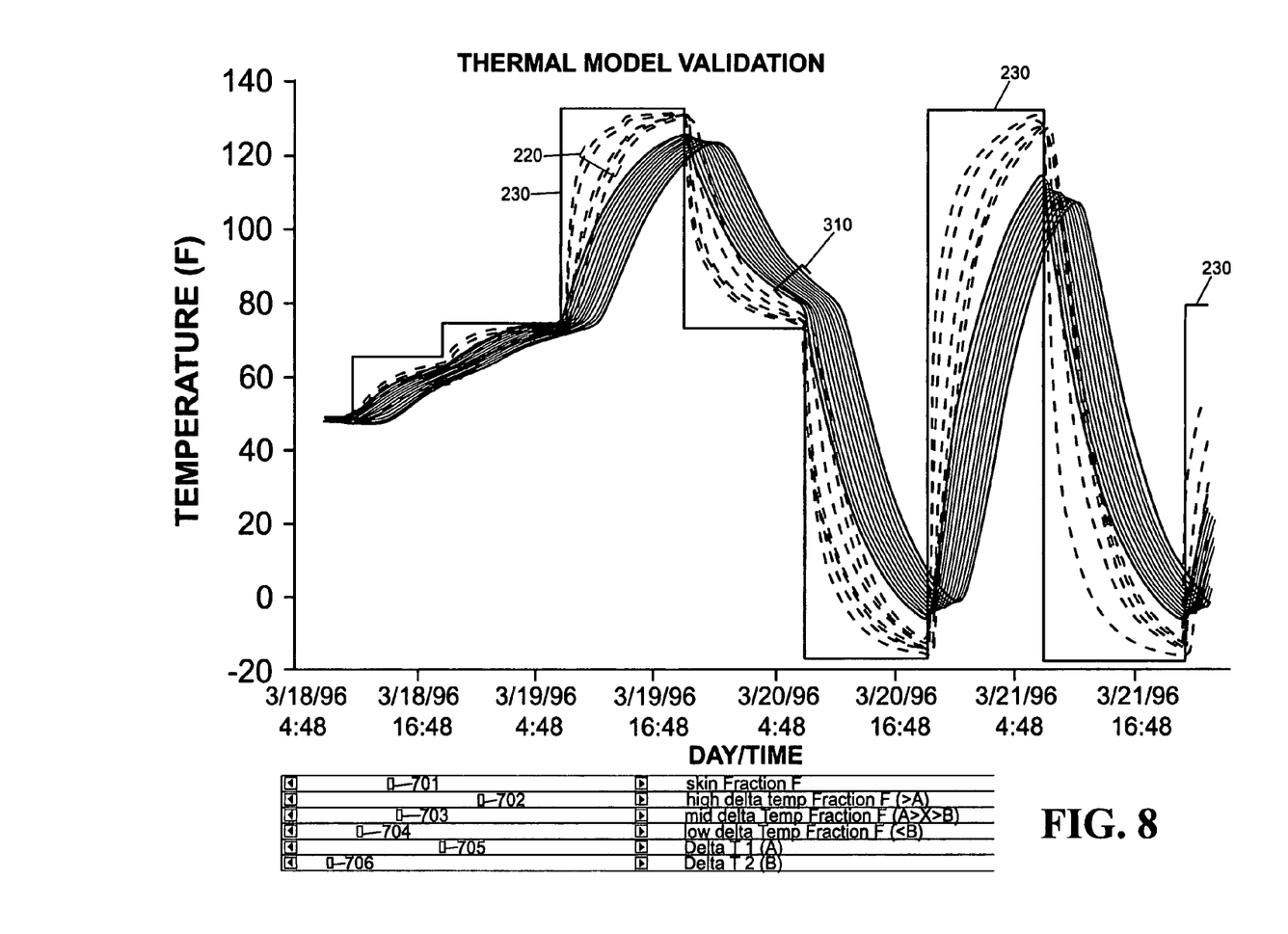
FIG. 8 is an exemplary printout of the thermal behavior modeling method's GUI screen upon the completion of step 60.2 of FIG. 7.

FIG. 8 is an exemplary printout of the thermal behavior modeling method's GUI screen upon the completion of step 60.2 of FIG. 7. Referring in combination to FIGS. 7 and 8, the visual curve fitting method used in step 70.2 of this secondary embodiment is accomplished by allowing the user to manipulate a series of slide bars in order to overlay a generic curve set 310 on top of the actual data curve set 220 (plotted within lines indicating actual outside temperature 230) in order to develop the model curve set 410. This method uses a series of six slide bars (701-706) vice five used in the primary embodiment.

Based upon experimental results using the primary embodiment the following was determined. Regardless of the actual temperatures, the best fitting value of the constant F is highly a function of the value of ΔT. As a result, the preferred embodiment of the invention defines the value of the constant F at 3 different ranges of ΔT. When ΔT is greater than certain value A ("high delta temperature), the model uses one value of fraction (F). When ΔT is lower than certain value B ("low delta temperature"), the model uses another value of fraction (F). When ΔT is a value between A and B ("mid delta temperature"), the model uses a third value of fraction (F) different from the other two. Lastly, the skin response is fixed regardless of the ΔT because the basic principle of $T_2=T_1+(T_{env.}-T_1) \times F$ works well to represent the skin (i.e. outer layer) response without splitting the value of F across three different delta temperatures.

With this in mind, the simpler secondary embodiment of the present invention was developed. In this embodiment regardless of the actual temperature only four F values are selected and they are selected based upon the value ΔT. The step 70.2 of the method of this secondary embodiment of the present invention uses two slide-bars (slide bars 705 and 706) to set the values of A and B and three additional slide bars (slide bars 702-704) to set the three corresponding fractional values (F) for use if ΔT>A, ΔT<B, or A>ΔT>B. The user then references the values indicated on particular slide bars in "IF" statements on the spreadsheet to determine the appropriate values of F to be used in plotting the equation curve. So, depending on the value of ΔT the user automatically varies the value for F in plotting the results of the equation $T_2=T_1+(T_{env.}-T_1) \times F$ and eventually form the model curve set 410.

The user maintains a visual assessment of how well the model matches the actual data as the values of F, A and B are changed using the slidebars.

As discussed briefly above, the skin response works well (meaning that heat transfer is efficient) independent of $\Delta T$. Slide bar 701 is used to set the value of F for skin response. However, the model can be improved upon by applying the same principle of the artificial layer response to make the F value representing the skin response of the object as a function of $\Delta T$ (like the approach used in the rest of the model).

The slide bars 705 and 706 determine the values for A and B. As a practical matter, the range of values of A and B should be set (sub-step 70.2*a*) on the slide bars 705 and 706 somewhere between the greatest documented delta temperature exposure evidence in the actual data and 0. For example, when the greatest delta temperature available in the validation data was 100C, the possible values of A and B should be set somewhere between 0 and 100. If the greatest documented delta temperature is 800C, the slide bars should be to range between 0 and 800.

The slide bars 701-704 are used to supply the values for the various F constants to be plugged into the equations. The slide bar ranges for each value A and B (i.e. 0 to 100° C.) (sub-step 70.2*a*), the selected values of A and B on scroll bars 705 and 706 (sub-step 70.2*b*), and the selected values for F on scroll bars 701-704 (sub-step 70.2*c*), all depend upon the heat transfer properties of an object. As with the primary embodiment, manipulation of the slide-bars 701-706 (i.e. to the right or left via the computer's mouse, by clicking on appropriate slidebar and dragging it to the new position or by clicking, as required, the corresponding arrow indicators) will alter in real-time the generic curve set 310 displayed on the GUI. The user will manipulate these slide bars at sub-steps 70.2*a-c* in combination (a process similar to that described above with regard to sub-steps 70.1*a-d* of the primary embodiment), until the generic curve set 310 overlays the actual data curve set 220.

Figure 9:
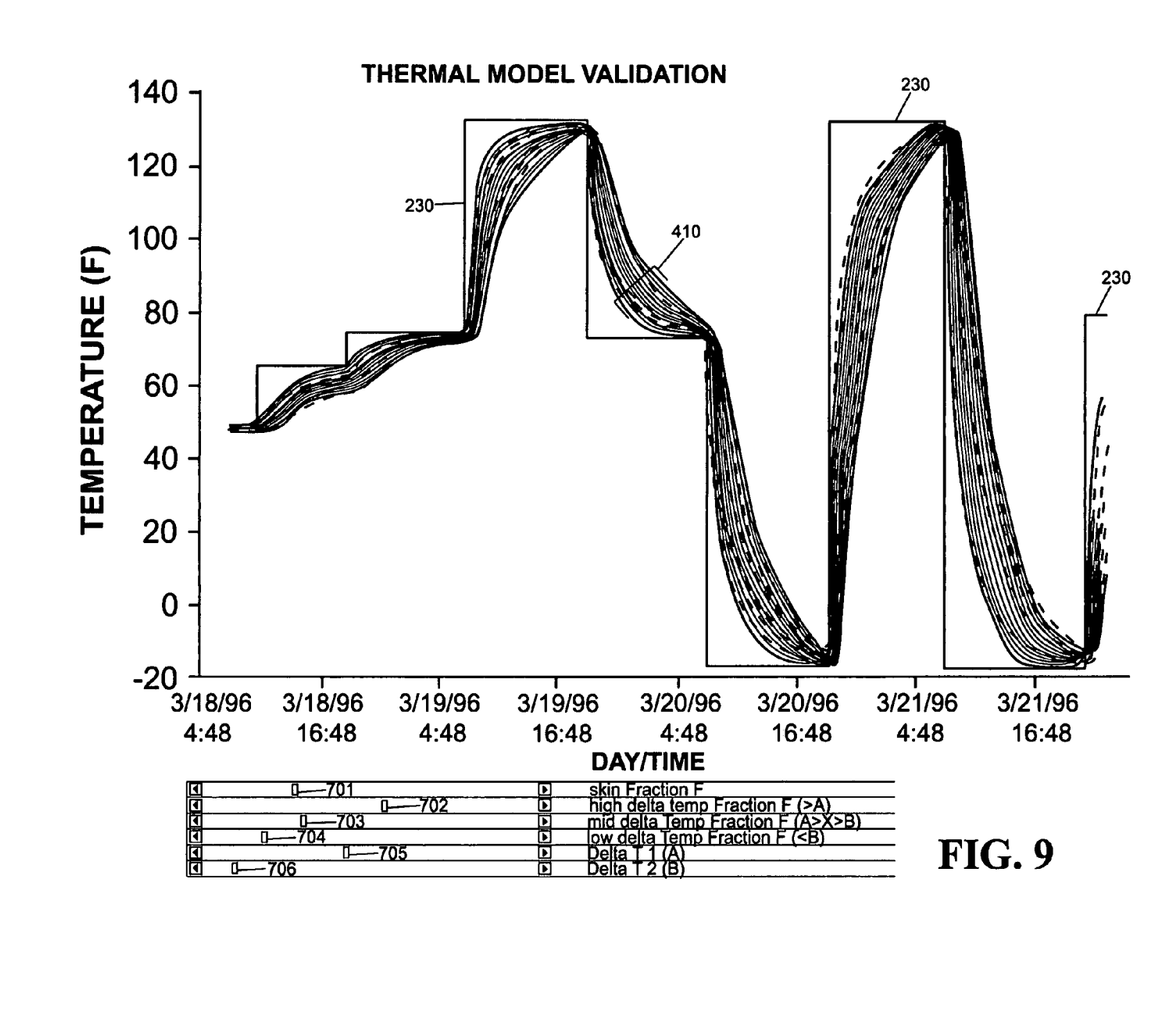
FIG. 9 is an exemplary printout of the thermal behavior modeling method's GUI screen upon the completion of step 70.2, including each sub-step, of FIG. 7.

FIG. 9 is an exemplary printout of the thermal behavior modeling method's GUI screen upon the completion of step 70.2 (including each sub-step 70.2*a-c*) of FIG. 7. As with the primary embodiment, completion of step 70.2 with the model curve set 410 overlaying the actual data curve set 220 simultaneously validates the model. The graph of FIG. 9 clearly illustrates that the model curve set 410 developed using the method of the secondary embodiment of the present invention is strikingly similar to the actual data results 220. The validation confirms that this visual curve fitting approach allows an individual to create a mathematical model for predicting the thermal response of an item without the need for determining material-of-construction properties, or the often labor intensive task of creating a finite element model of the appropriate size, shape, and weight Also, as discussed above with regard to the primary embodiment, the range for each F value is a fraction between 0 and 1. Since preferred commercially available spreadsheet software (i.e. Excel®) does not allow slide bars to be programmed with fractional values, the range for each F is preferably set between 0 and 1000. The selected F value is then divided in the programmed generic curve equation (see step 20.2) by 1000 in order to obtain a fraction with three significant numbers to the right of the decimal point (fine resolution).

The secondary embodiment (as depicted in FIG. 9) is simpler than the primary embodiment because each curve in the model curve set 410 shares a common F constant that is a function of the value $\Delta T$. In the primary embodiment (as depicted in FIG. 5) the F constant is a function of both the value $\Delta T$ and individual factors affecting each individual curve in the model curve set 210 independently.

In both the primary and secondary embodiments, the each of the values set by the slide bars (160-165 for the primary embodiment and 701-706 for the secondary embodiment) are reflected in the individual cells on the spreadsheet. Once a model curve set (210 and 410 respectively) is found for a particular object, the values selected on the corresponding slide bars are set permanently on that design and the thermal model for that particular object is fixed for that range of temperature exposures.

The following is an exemplary of the actual text in a validation spreadsheet cell of the secondary embodiment, (the cell represents the skin response independent of $\Delta T$ for equation $T_2 = T_1 + (T_{env.} - T_1) \times F$:

=C2672−(C2672−B2673)*C$2/1000 where:

C2672 is the previous object skin temperature
B2673 is the latest environmental temperature
C$2 is the constant fraction (F) being controlled by the scrollbar 701

The following is an exemplary of the actual text in a spreadsheet cell of the secondary embodiment, representing the thermal response of the layers inside an object for the above equation:

=IF(*ABS*(D2672−C2673)>$C$1, D2672−(D2672−C2673)*($D$1/1000),

IF(*ABS*(D2672−$B2673)>$C$3, D2672−(D2672−C2673)*($D$2/1000), D2672−(D2672−C2673)*$D$3/1000))

Where:
D2672 is the previous temperature of the layer in question
C2673 is the temperature of the layer next to the outside of the layer in question
$C$1 is the value of A explained above
$C$3 is the value of B explained above
$D$1 is the fraction (F) controlled by the scrollbar 2
$D$2 is the fraction (F) controlled by the scrollbar 3
$D$3 is the fraction (F) controlled by the scrollbar 4

The method of the both the primary and secondary embodiments of the present invention is preferably implemented in one of a number of readily commercially available spreadsheet software applications (e.g. Microsoft® Excel®) allowing for widespread use and provides a visual curve-fitting approach to vary the constants found in a loaded generic equation set in order to match, as closely as possible, a generic curve set with an actual curve set to develop a model curve set. To assist with the visual curve fitting in either the primary or secondary embodiments, the generic curve sets (110, 310) and actual data curve sets (120, 220) may be color-coded or otherwise distinguishable from each other.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:
1. A method for modeling a thermal behavior of an item, comprising:
loading a set of generic thermal response equations into an open spreadsheet software application having a graphical user interface of a processor, wherein said set of generic thermal response equations are generated absent data of thermal and spatial attributes of said item;

plotting a generic thermal response curve set being based on said generic thermal response equations onto a graph of temperature over time for producing a plotted generic curve set, wherein said graph is visible on said graphical user interface, and wherein said generic thermal response curve set is comprised of a plurality of individual curves defining consecutive artificial layers of said item;

generating a limited set of actual thermal response data;

loading into said open spreadsheet the limited set of actual thermal response data for said item, wherein said actual thermal response data reflects the actual thermal response of said item subject to conditions meant to induce heat transfer within the item when exposed to a specific environmental temperature for a specific period of time;

plotting an actual thermal response curve set being based upon said actual thermal response data onto said graph for producing a plotted actual thermal response curve set, wherein said plotted actual thermal response curve set comprises a plurality of individual curves that define the thermal response of actual consecutive layers of said item; and using said graphical user interface for approximating, a non-linear regression being based on parameters of said generic thermal response equations, which are fixed, by dynamically manipulating a plurality of slidebars where said plotted generic curve set visually fits said plotted generic curve set to said plotted actual thermal response curve set in real-time so that the plotted generic curve set aligns with and matches, as closely as possible, the plotted actual thermal response curve set, which creates and predicts a model thermal response curve set for said item under any thermal environment.

2. The method of claim 1, wherein the thermal response curve set illustrates that the thermal response of an item varies depending upon the layer of the item measured.

3. The method of claim 2, wherein each of said artificial layers of said generic curve set are a function of the temperature of the outside adjacent layer.

4. The method of claim 1, wherein the limited set of actual thermal response data for said item includes a thermal skin response defined by the thermal response of the outermost layer of said item, a thermal thickness response defined by the thermal response of the bulk layers of said item, and a thermal tail response defined by the thermal response of the core of said item when the item temperature is near thermal equilibrium.

5. The method of claim 1, wherein said generic thermal response equation for an item is $T_2 = T_1 + (T_{env.} - T_1) \times F$, where $T_{env}$ is the environmental temperature that the item is exposed to for a predetermined time, $T_1$ is the initial temperature of the item, $T_2$ is the ending temperature of the item and F is a constant with a value between 0 and 1.

6. The method of claim 1, wherein each consecutive artificial layer represented by an individual curve in the generic thermal response curve set is treated, for the purposes of plotting each individual curve in the generic curve set as a separate item such that the temperature of the outer adjacent layer is input into the thermal equation for each individual curve as the environmental (ambient) temperature ($T_{env}$) for the inner adjacent layer.

7. The method of claim 1, wherein a shape and a thickness of said actual thermal response curve set reflects thermal skin response, thermal thickness response and thermal tail response of said item.

8. The method of claim 1, wherein each individual curve in the generic curve set is formed using said generic thermal response equation and for each individual curve three different F values are supplied and input into the generic thermal response equation to create the individual curve shape and distance between individual curves, thereby reflecting the thermal skin response, thermal thickness response and thermal tail response, for the particular artificial layer.

9. The method of claim 1, wherein a spreadsheet software application in conjunction with said graphical user interface allows a user to input supplied data into the loaded set of generic thermal response equations in order to accomplish the visual curve fitting of the generic curve set with the actual curve set.

10. The method of claim 1, wherein a plurality of slide bars on said graphical user interface are used to set the values for the supplied data input into the generic thermal response equations for each individual curve representing an artificial layer in the generic curve set.

11. The method of claim 10, wherein said plurality of slide bars include (1) a slide bar for setting environmental temperature ($T_{env}$) defined as the outside temperature for the thermal skin response or otherwise the temperature of the adjacent outer layer, (2) a slide bar for setting the original temperature of the layer ($T_1$), and (3) individual slide bars for setting the F value for the thermal skin response, thermal thickness response and thermal tail response for each artificial layer.

12. The method of claim 10, wherein $T_{env.} - T_1$ is $\Delta T$ and wherein said plurality of slide bars include (1) a slide bar for setting a temperature A, (2) a slide bar for setting a temperature B, (3) a slide bar for setting the value of F when $\Delta T$ is greater than A, (4) a slide bar for setting the value of F when $\Delta T$ is between A and B, and (5), a slide bar for setting the value of F when $\Delta T$ is less than B.

13. A mathematical modeling system for predicting a thermal response of an item, comprising;

means for collecting data characterizing a set of generic thermal response equations and actual thermal response data, wherein said set of generic thermal response equations are generated absent data of thermal and spatial attributes of said item;

a first data storage record for storing information relating to said set of generic thermal response equations;

a second data storage record for storing information relating to said actual thermal response data;

means for displaying a two-dimensional plot of said set of generic thermal response equations and a two-dimensional plot of said actual thermal response data;

means for approximating, a non-linear regression by dynamically adjusting said two-dimensional plot of said set of generic equations using a plurality of adjustment means such that said plot of said set of generic equations substantially overlays said two-dimensional plot of said actual thermal response data in real-time, wherein said plurality of adjustment means comprises a first slide bar, which corresponds to a generic thermal skin response, a second slide bar, which corresponds to a generic thermal thickness response, and a third slide bar which corresponds to a generic thermal tail response; and a computer for maintaining said first and said second data storage records and said means for adjusting said two-dimensional plot of said set of generic equations, and allowing a user to access, manipulate, and display selected data representing a mathematical model of the thermal response of an item, wherein parameters of said set of generic thermal equations are fixed so that said mathematical model predicts said thermal response for the item under any thermal environment.

14. A device for developing a model thermal response curve set for an item, comprising:

a computer comprising a storage capacity, a spread sheet software application and a graphical user interface;

generic thermal response equations being loaded into said spreadsheet software application and being plotted on said graphical user interface as a generic thermal response curve set, wherein said generic thermal response equations are generated absent data of thermal and spatial attributes of said item;

actual thermal response data being loaded into said spread sheet software application and being plotted on said graphical user interface as an actual thermal response curve set; and a plurality of slidebars on said graphical user interface for giving a user point and control for approximating a non-linear regression being based on parameters of said generic thermal response equations, which are fixed, by dynamically manipulating the plurality of slidebars so that said generic thermal response curve set overlays said actual thermal response curve set in real-time, thereby developing and predicting a model thermal response curve set for the item under any thermal environment.

15. The device of claim 14, wherein said generic thermal response equation is $T_2=T_1+(T_{env.}-T_1)\times F$, where $T_{env}$ is the environmental temperature that the item is exposed to for a predetermined time, $T_1$ is the initial temperature of the item, $T_2$ is the ending temperature of the item and F is a constant with a value between 0 and 1.

16. The device of claim 14, wherein said generic thermal response curve set comprises a plurality of curves representing artificial layers of said item and each of said curves is defined by the generic thermal response equation.

17. The device of claim 16, wherein said thermal response curve of each artificial layer is a function of the temperature of its outer adjacent layer and wherein the thermal response of each artificial layer is comprised a the thermal skin response defined by the thermal response of the outermost layer of said artificial layer, a thermal thickness response defined by the thermal response of the bulk of said artificial layer, and a thermal tail response defined by the thermal response of the core of said artificial layer when the temperature of the layer is near thermal equilibrium.

18. The device of claim 14, wherein thermal response curve set for the item is comprised of the thermal skin response defined by the thermal response of the outermost layer of said item, a thermal thickness response defined by the thermal response of the bulk of said item, and a thermal tail response defined by the thermal response of the core of said item when the item temperature is near thermal equilibrium.

19. The device of claim 14, wherein said plurality of slide bars are used to set the values for the supplied data input into the generic thermal response equations for each individual curve representing an artificial layer in the generic curve set.

20. The device of claim 19, wherein said plurality of slide bars include (1) a slide bar for setting environmental temperature ($T_{env}$), (2) a slide bar for setting the original temperature of the layer ($T_1$), and (3) a plurality of slide bars for setting the F value for the thermal skin response, thermal thickness response and thermal tail response for each artificial layer.

* * * * *